United States Patent Office 3,707,573
Patented Dec. 26, 1972

3,707,573
DIHALOGENATION OF PERHYDROPOLYPHENYL HYDROCARBONS
Abraham Schneider, Overbrook Hills, Pa., assignor to Sun Oil Company, Philadelphia, Pa.
No Drawing. Continuation-in-part of application Ser. No. 702,789, Feb. 5, 1968. This application Dec. 22, 1969, Ser. No. 887,377
The portion of the term of the patent subsequent to Dec. 23, 1986, has been disclaimed
Int. Cl. C07c 17/10, 23/18
U.S. Cl. 260—648 R            12 Claims

ABSTRACT OF THE DISCLOSURE

Perhydropolyphenyl hydrocarbons having 2–6 rings and 0–3 alkyl substituents per ring containing up to 3 carbon atoms each are dichlorinated or dibrominated by reacting the same under homogeneous conditions and at −30° C. to 20° C. with a $C_4$–$C_5$ tertiary alkyl chloride or bromide, using as catalyst dissolved $AlCl_3$ or $AlBr_3$, and then recovering a dichloro or dibromo perhydropolyphenyl product in which the halogen atoms are attached to rings. The dihalo products have utility as intermediates for preparing difunctional derivatives, e.g. diacids, dialcohols or diamides, which are useful as monomers in polymer manufacture, or diesters which are useful as plasticizers in polyvinyl chloride. They also can be used to alkylate benzene and yield polycyclic hydrocarbons of low aromaticity useful as traction fluid components or useful for further conversion to sulfonates suitable as detergent components of lubricating oil compositions.

CROSS REFERENCE TO RELATED APPLICATIONS

This application is a continuation-in-part of my copending application Ser. No. 702,789, filed Feb. 5, 1968, now Pat. No. 3,485,880, issued Dec. 23, 1969, which discloses and claims a process for polychlorinating or polybrominating $C_{10}$–$C_{20}$ adamantane hydrocarbons at bridgehead positions in the adamantane nucleus. The procedure involves reaction of the feed hydrocarbon under homogeneous conditions with a $C_4$–$C_5$ tertiary alkyl chloride or bromide, using as catalyst dissolved $AlCl_3$ or $AlBr_3$. The present process utilizes a similar procedure for dihalogenating perhydropolyphenyl hydrocarbons.

My copending application Ser. No. 883,579, filed Dec. 9, 1969, involves a similar procedure for the dihalogenation of alkylcyclohexanes; my copending application Ser. No. 886,797, filed Dec. 19, 1969, involves a similar procedure for the dihalogenation of alkyldecahydronaphthalenes; my copending application Ser. No. 883,580, filed Dec. 9, 1969, involves an analogous procedure for the dihalogenation of certain types of branched alkanes; and my copending application Ser. No. 886,796, filed Dec. 19, 1969, likewise involves the utilization of a similar procedure for the mono- and dihalogenation of fused ring polycyclic perhydroaromatics.

BACKGROUND OF THE INVENTION

This invention relates to the conversion of perhydropolyphenyl hydrocarbons containing 2–6 rings with 0–3 unbranched alkyl groups of the $C_1$–$C_3$ range per ring into dihalogenated derivatives in which the halogen is chlorine or bromine. The halogenating agent is a $C_4$–$C_5$ tertiary alkyl chloride or bromide. The products are dichloro or dibromo perhydropolyphenyls having the same number of carbon atoms as the starting material and containing the halogen atoms as substituents on the rings. These products have utility as intermediates for preparing difunctional derivatives, e.g., diacids, dialcohols or diamides, which are useful as monomers in polymer manufacture, or diesters which are useful as plasticizers in polyvinyl chloride. They also can be used to alkylate benzene and yield polycyclic hydrocarbons of low aromaticity useful as traction fluid components or useful for further conversion to sulfonates suitable as detergent components of lubricating oil compositions.

Hydrogen-halogen exchange reactions between a tertiary alkyl halide, such as t-butyl chloride, and various hydrocarbons containing one or more tertiary hydrogen atoms have been described, for example, by C. W. Kruse, Preprints, ACS Pet. Div., vol. 12, No. 2, Advances in Petrochemical Symposium, Miami Beach, Fla. (April 1967). In the described process an aluminum chloride complex was used for effecting the reaction, which was conducted at room temperature, and monochlorination of such feed materials as methylcyclohexane and 2,3-dimethylbutane was disclosed. The reaction system was heterogeneous and no dichloride product was formed.

Other hydrogen-halogen exchange reactions between tertiary butyl chloride and various hydrocarbons using aluminum trichloride as catalyst have been described in the following United States patents:

| Patentee | Patent No. | Issue date |
| --- | --- | --- |
| Schmerling | 2,448,156 | Aug. 31, 1948. |
| Condon | 2,629,748 | Feb. 24, 1953. |
| Do | 2,646,453 | July 21, 1953. |
| Schneider et. al. | 2,742,507 | Apr. 17, 1956. |
| Gerzon | 3,096,372 | July 2, 1963. |
| Mahan et. al. | 3,230,269 | Jan. 18, 1966. |
| Kruse et. al. | 3,247,277 | Apr. 19, 1966. |

The reaction conditions taught in these references generally are such that the reaction system is heterogeneous, comprising a hydrocarbon phase and a catalyst phase. None of these references teaches the preparation of dihaloperhydropolyphenyls by means of a hydrogen-halogen interchange reaction.

SUMMARY OF THE INVENTION

The present invention provides a process for utilizing the hydrogen-halogen interchange reaction to convert perhydropolyphenyl hydrocarbons into dihalo derivatives. The starting hydrocarbons have the following characteristics: (1) they have two to six cyclohexane rings linked to each other in a chain through single valences; and (2) the rings have either no alkyl substituents or up to and including three alkyl substituents per ring which substituents are methyl, ethyl or n-propyl or any combination thereof. The procedure involves a hydrogen-halogen interchange reaction between one or more of such perhydropolyphenyls and a $C_4$–$C_5$ tertiary alkyl chloride or bromide, promoted by means of $AlCl_3$ or $AlBr_3$ in solution. The reaction is carried out at a relatively low temperature, viz in the range of −30° C. to 20° C., and conditions are such that a homogeneous reaction mixture is maintained.

I have now found that in order to dihalogenate perhydropolyphenyl hydrocarbons effectively it is essential that a substantially homogeneous reaction system be maintained with the aluminum trihalide catalyst in solution in the reactant mixture.

The process of the invention comprises the following steps:

(a) forming a solution of (1) a perhydropolyphenyl hydrocarbon having 2–6 rings and 0–3 unbranched alkyl substituents containing 1–3 carbon atoms each, and (2) a $C_4$–$C_5$ tertiary alkyl halide in which the halogen is chlorine or bromine in molar ratio to the perhydropolyphenyl of at least 2:1 and preferably in excess of 3:1, said solution being capable of dissolving and maintaining therein the aluminum trihalide hereinafter specified;

(b) maintaining said solution at a temperature in the range of −30° C. to 20° C. while admixing therewith and dissolving therein an aluminum trihalide in which the halogen is the same as that in the tertiary halide, the weight ratio of aluminum trihalide to the tertiary halide being sufficient to promote dihalogenation of said perhydropolyphenyl hydrocarbon;

(c) maintaining the resulting solution within said temperature range and in homogeneous phase until at least substantial dihalogenation of the perhydropolyphenyl hydrocarbon has occurred;

(d) and recovering from the reaction mixture a dihalogenated perhydropolyphenyl product in which the halogen atoms are attached to rings.

DESCRIPTION

For convenience, the term "perhydropolyphenyl" herein is sometimes abbreviated as "PHP."

As a specific illustration of the process, 10 parts (by weight) of 3,5,3′,5′-tetramethylbicyclohexyl are dissolved in 100 parts of tertiary butyl bromide, the solution is cooled to −5° C. and 3 parts of $AlBr_3$ powder are mixed into and dissolved in the solution. The mixture is stirred at −5° C. for 30 minutes, during which time isobutane is formed and partly evolves. Then $AlBr_3$ in amount of 3 parts again is added and mixing is continued at −5° C. for 30 minutes more. The mixture remains essentially homogeneous, no separate catalyst complex phase being formed. The mixture is then washed with water to remove the inorganic material and fractionally distilled. A dibrominated product fraction is recovered which is a mixture of dibromotetramethylcyclohexyl isomers in which the two bromine atoms mainly are substituted at tertiary carbon positions in separate rings.

As a further specific illustration, a $C_{22}$–$C_{24}$ mixture of dialkylperhydroterphenyls in which the alkyl groups are ethyl and n-propyl, prepared by alkylating terphenyl with a mixture of ethyl chloride and n-propyl chloride, separating the $C_{22}$–$C_{24}$ alkylate fraction and completely hydrogenating same, is used as feed. This $C_{22}$–$C_{24}$ feed in amount of 10 parts (by weight) is dissolved in a mixture of 40 parts of t-butyl chloride and 40 parts of methylene chloride, the solution is agitated at about 0° C., 2.5 parts of $AlCl_3$ powder are dissolved therein and mixing is continued for one hour. After this, $AlCl_3$ is added twice again each time in the same amount as before, and the mixture is agitated for one hour at 0° C. after each addition. All of the catalyst goes into and remains in solution during the reaction. Water washing followed by fractional distillation of the reaction mixture yields a dichlorodialkylperhydroterphenyl fraction as one of the products. The chlorine atoms are all attached to the rings and are located both at secondary and tertiary carbon atoms. In this illustration the methylene chloride does not enter into the reaction, serving merely as an inert solvent.

The halogenating agent for practicing the invention must be a $C_4$ or $C_5$ tertiary alkyl chloride or bromide or, in other words, t-butyl or t-amyl chloride or bromide. Primary or secondary halides are not suitable, for these will not react in the manner desired. Also it is essential for purposes of the present invention that a low reaction temperature, i.e., in the range of −30° C. to 20° C., be used, since at higher temperatures cracking reactions will occur causing sludge to precipitate and the desired dihalo derivatives will not be produced in substantial amounts. Preferably a reaction temperature in the range of −10° C. to 10° C. is employed.

It is also important in the present process that the reaction mixture comprising the PHP and the $C_4$–$C_5$ tertiary alkyl halide is capable of dissolving and maintaining in solution therein all of the $AlCl_3$ or $AlBr_3$ added. In other words, conditions must be such as to maintain substantially the entire reaction mixture as a single phase and avoid the formation of a separate catalyst complex phase.

The preferred way of establishing and maintaining a homogeneous system is to utilize a considerable excess of the tertiary alkyl halide over the stoichiometric amount required for the desired degree of dihalogenation. When the $AlCl_3$ or $AlBr_3$ is added to the mixture, it reacts with the tertiary alkyl halide to form a complex and this complex must remain at least mainly in solution. The precise function of the complex is not known with certainty and it may be that at least part of it acts as the catalytic species. However, it is considered more probable that dissolved $AlCl_3$ or $AlBr_3$ is the catalytic agent and that, at least in the case of $AlCl_3$, the complex formed is necessary for bringing the $AlCl_3$ into solution. In any event, sufficient excess tertiary alkyl halide should be present to act as solvent for this catalyst complex and keep it in solution. Otherwise, if a homogeneous reaction mixture is not maintained and the catalyst complex forms a separate phase, substantial dihalogenation will not be achieved.

For example, when perhydroquinquephenyl is to be reacted with t-butyl chloride without the aid of an inert solvent to give dichloro product, a substantial excess of t-butyl chloride over a 2:1 molar ratio should be used so that the aluminum chloride complex will remain in solution. Typically a molar ratio of t-butyl chloride to perhydroquinquephenyl above 3:1, e.g., in the range of 5:1 to 25:1, can be employed to maintain a homogeneous solution. For dichlorination or dibromination of other starting hydrocarbons without an inert solvent, analogous ratios of reactants are employed. In all cases the presence of t-butyl chloride in substantial excess tends to inhibit isomerization of the feed materials as well as the kinetic chloro products formed in the reaction.

Another manner of practicing the invention to maintain homogeneity of the reaction mixture is to employ the $C_4$–$C_5$ tertiary alkyl halide in a low proportion, and additionally to use an inert halogenated solvent to keep in solution the complex formed between the tertiary alkyl halide and $AlCl_3$ or $AlBr_3$. In such case the tertiary alkyl halide can be used in a proportion as low as the stoichiometric 2:1 molar ratio, as long as sufficient inert solvent is employed. Certain halogenated hydrocarbons are inert under conditions used in the process and will not themselves react with the aluminum trihalide to form a complex. These can be used as solvent to maintain the reaction mixture in homogeneous phase. Halogenated hydrocarbons which are suitable for this purpose include the following: methylene chloride; 1,1,2,2-tetrachloroethane; pentachloroethane; and the bromine homologues of each of the foregoing solvents. This manner of practicing the invention is not, however, generally preferred since it requires an additional component in the reaction system, and it is usually preferable merely to use an excess of the $C_4$–$C_5$ tertiary alkyl halide as solvent and thus dispense with the need for an inert halogenated solvent.

The hydrocarbon feed can be one or more perhydropolyphenyl hydrocarbons having two to six cyclohexane rings linked to each other through single valences of any carbon atoms in the rings. The rings can contain no alkyl substituents or each ring can have one to three unbranched alkyl groups of the $C_1$–$C_3$ range. In other words, these substituents can be methyl, ethyl or n-propyl, or any combination of these alkyl groups. Any PHP hydrocarbon as here defined can be dichlorinated or dibrominated in the present process to yield dihalo products. In the case of PHP's having a single alkyl substituent a considerable proportion of the dihalo product generally will have one halogen atom attached to the same carbon atom to which the alkyl group is attached. For doubly substituted feed hydrocarbons with the two alkyl groups on different rings, a substantial amount of the dihalo product will have the halogen atoms attached to the same carbon atoms to which the two alkyl substituents are also attached, but isomeric products in which at least one of the halogen atoms is attached to a secondary carbon atom generally are also obtained. The spacing of alkyl groups in the product will not necessarily be the same as in the starting material, depending upon whether the reaction conditions allow isomerization to occur. The presence of a large excess of the tertiary alkyl halide in the reaction mixture will suppress isomerization.

Unsubstituted feed hydrocarbons for use in the present process can be derived by hydrogenating the corresponding polycyclic aromatics which are commercially available materials. The latter include biphenyl, terphenyl, quaterphenyl, quinquephenyl and sexiphenyl. For the present purpose the two linkages for each non-terminal ring can be ortho, meta or para to each other. Any of these polyphenyl hydrocarbons can be fully hydrogenated by known hydrogenation procedures to yield the corresponding perhydropolyphenyl for use as feed in the present process.

Methyl-, ethyl- and n-propyl-substituted feedstocks can be obtained by alkylating the polyphenyl hydrocarbons in known manner by means of methyl, ethyl or n-propyl chloride, or the corresponding alcohols, and then completely hydrogenating the alkylation product. Feedstocks containing mixed alkyl substitutents can be obtained by alkylating the parent aromatic with a mixture of alkylating agents containing any combination of methyl, ethyl and n-propyl groups, and then fully hydrogenating the alkylate product. The specific positions of the alkyl groups on the various rings do not affect the operability of the process. As a general rule, the presence of alkyl substituents on the rings facilitates the dihalogenation reaction.

The following equation illustrates the reaction, starting, for example, with t-butyl chloride and 4,4'-dimethylbicyclohexyl (most hydrogen atoms being omitted, for convenience):

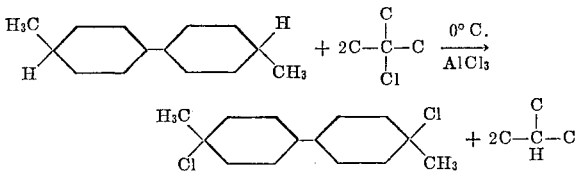

The products of the reaction, as shown, are 4,4'-dichloro-4,4'-dimethylbicyclohexyl and isobutane. This dichloro compound is favored kinetically and also thermodynamically and will constitute the dichloro isomer produced in largest amount. However smaller amounts of isomeric dichloro products generally also will be formed, including isomers resulting from shifting of positions of chlorine atoms as well as methyl groups. Beside containing these dichloro compounds the final reaction mixture will include mixed monochlorinated products usually including both secondary and tertiary monochlorides.

In the foregoing equation the positions of the methyl groups in the main dihalo product are shown to be the same as in the starting PHP, but this would not necessarily be the case for other PHP's. Considerable shifting of positions of alkyl groups on the rings and even of linkages between rings can occur depending upon how much t-butyl chloride is present, how much aluminum trihalide is used in conducting the reaction and the particular feed material used. The tendency is for the kinetic dichloro product first obtained to isomerize to an equilibrium mixture of dichloro PHP's if enough AlCl₃ is added to the reaction mixture, and this involves shifting of the alkyl groups as well as the chlorine atoms. As previously stated, these isomerization reactions can be suppressed by employing a large excess of the t-butyl chloride.

When the starting PHP has no alkyl substituent or only one alkyl substituent, dihalogenation of the nucleus nevertheless will occur under conditions of the present process. When the feed contains still more alkyl substituents, the dihalogenation reaction generally occurs even more readily.

A preferred way of carrying out the invention utilizing an excess of tertiary alkyl halide as solvent is given in the following description using t-butyl chloride as the tertiary halide and AlCl₃ as catalyst. The starting PHP is dissolved in the t-butyl chloride, using, for example, between 5 and 25 moles of t-butyl chloride per mole of the PHP, and the mixture is cooled to 0° C. While the mixture is being well agitated, AlCl₃ is added thereto in amount usually between 3 and 25 parts by weight per hundred parts of t-butyl chloride. In some cases it may be advantageous to add the AlCl₃ in incremental amounts throughout a time of 10–60 minutes in order to more easily control reaction conditions such as temperature and rate of gas evolution. However, if control of the reaction presents no problem, substantially the same results can be obtained by adding all of the required amount of AlCl₃ at once.

When an amount of AlCl₃ is added, it goes into solution and forms with the t-butyl chloride a complex which remains in solution. As previously mentioned, the complex formed may act as solvent for uncomplexed AlCl₃ which, when brought into solution, functions as the catalytic agent. This promotes the hydrogen-chlorine exchange reaction. Also a slow evolution of HCl generally occurs indicating some side reaction, and the catalyst activity concurrently declines until the reaction ceases. Addition of a further amount of AlCl₃ will then result in more solubilized catalyst and further promote the hydrogen-chlorine exchange reaction until the catalyst activity again diminishes. The procedure of adding incremental amounts of AlCl₃ can be continued to promote the exchange reaction until an optimum degree of dichlorination has been reached. Alternatively, all of the AlCl₃ needed can be added at the beginning provided that the reaction does not proceed so fast as to get out of control. Removal of isobutane from the system as it is formed will expedite the hydrogen-halogen exchange reaction.

The amount of AlCl₃ or AlBr₃ that should be used depends mainly upon the amount of tertiary alkyl halide in the mixture and the reaction temperature selected within the specified range of −30° C. to 20° C. The higher the reaction temperature the greater is the tendency of the AlCl₃ or AlBr₃ to be consumed in side reactions and the more that will be required. Preferably, the weight proportion of total aluminum trihalide to tertiary alkyl halide should be in excess of 3:100 and sufficiently in excess of this ratio to maximize yield of the dihalogenation product. Side reactions can be inhibited by maintaining a pressure of hydrogen chloride in the reaction system, e.g. by maintaining a partial pressure of HCl in the range of 50–100 p.s.i.

When the reaction has been completed, the mixture can be washed with water to remove the catalyst residues and then the dihalogenated product can be separated from the other components in any suitable manner, for example, by fractional crystallization or distillation.

Dibromo or dichloro PHP's produced by the present invention are useful as intermediates for preparing monomers suitable for making various types of polymers such as polyesters or polyamides. For example, the dihalo-PHP's can be reacted in the presence of strong sulfuric acid with formic acid [see Koch et al., Liebig's Annalen der. Chemie, 618 (1958), 251–266] to produce corresponding diacids, or with HCN or nitriles [analogous to Ritter reaction, JACS, 70 (1948), 4045–4048] to form corresponding diamides. Dialcohols, also useful as monomers, can be made by esterifying the diacids and hydrogenating the resulting diesters. Such diacids and dialcohols can be used, for example, to make copolymers analogous to those shown in Caldwell et al. United States Pat. 2,891,930, issued June 23, 1959, which describes the use of 1,4-cyclohexanedicarboxylic acid and various diols for preparing polyesters. For instance, the diacid obtained from the dihalo product formed by reacting 4,4'-dimethylbicyclohexyl according to the invention can be substituted for the 1,4-cyclohexanedicarboxylic acid in the process of Caldwell et al. Such diacids also can be esterified to yield diesters which are particularly useful as plasticizers for polyvinyl chloride resins. For example, mixed dihalo products obtained from the above referred to $C_{22}$–$C_{24}$ material derived by alkylating terphenyl and perhydrogenating can be converted to diacids by the Koch reaction and the diacids then can be esterified, e.g. with octyl alcohol, to form a diester product useful as a plasticizer for polyvinyl chloride.

The dihalo PHP's, as well as the monohalo products of the present process, can be used to alkylate benzenoid hydrocarbons, such as benzene, toluene or xylenes, and yield polycyclic hydrocarbons of low aromaticity. This alkylation reaction can readily be effected by admixing the halogenated product with the benzenoid hydrocarbon and $AlCl_3$ or $AlBr_3$ at room temperature thereby causing HCl or HBr to split out and result in replacement of each halogen atom by an aryl group. The resulting alkylate will contain up to 2 benzenoid rings, with the other rings being saturated. This material is useful as a component of fluids for traction drive systems for the transmission of power, as described, for example, in the following U.S. patents: Rounds 3,394,603, dated July 30, 1968; Hamman et al. 3,411,369, dated Nov. 19, 1968; and Hamman et al. 3,440,894, dated Apr. 29, 1969. Alkylate products made in this manner also have utility as feedstock for the preparation of sulfonate detergents useful in lubricating oil compositions, since the aromatic rings therein are readily sulfonatable in known manner, e.g. by means of 100% $H_2SO_4$. Sulfonate product of relatively low aromaticity can be derived in this manner, a majority of the rings therein being saturated, and the preponderance of saturated rings will impart improved oil solubility, as compared with the oil solubility characteristics of sulfonates made from highly aromatic hydrocarbons.

The following example specifically illustrates the invention. In the accompanying table which presents the results, the total amount of $AlCl_3$ used up to the time of each sampling is indicated in terms of g. $AlCl_3$ per 100 g. of t-butyl chloride employed.

EXAMPLE

The PHP feed was bicyclohexyl and the halogenating agent was t-butyl chloride. A solution of 1.00 g. (0.0060 mole) of bicyclohexyl, 3.30 g. (0.0355 mole) of t-butyl chloride and 4.0 ml. of methylene chloride was stirred at 0° C. and about 0.05 g. of $AlCl_3$ powder was added. The mole ratio of t-butyl chloride to feed was 6.0. The $AlCl_3$ dissolved and a homogeneous, pale brown solution was immediately formed. The mixture was stirred at 0° C. for 20 minutes and then a 1.0 ml. sample was taken. This sample was diluted with 10 ml. of pentane to precipitate a small amount of catalyst complex which was separated. The hydrocarbon layer was water washed and dried with potassium carbonate, and the pentane was then evaporated to give a sample for analysis (Cut 1). To the remainder of the reaction mixture, about 0.03 g. of $AlCl_3$ again was added and mixing was continued at 0° C. for 20 minutes more. Another 1.0 ml. sample was taken and diluted with pentane to precipitate catalyst complex, and the material was worked up in the same way as for Cut 1 to give another sample (Cut 2) for analysis. A third addition of $AlCl_3$ in amount of 0.05 g. was made to the rest of the reaction mixture, the mixture was stirred for 20 minutes more at 0° C. and then was worked up in the same manner as before for analysis (Cut 3). The reaction mixture was essentially homogeneous during the entire reaction period. Each of the samples was analyzed by GLC. Results are shown in the table and are given in weight percent on a t-butyl chloride-free and methylene chloride-free basis.

TABLE.—REACTION OF BICYCLOHEXYL
[Mole ratio of t-butyl chloride: bicyclohexyl=6.0]

|  | Cut 1 | Cut 2 | Cut 3 |
|---|---|---|---|
| Total reaction time, min | 20 | 40 | 60 |
| Gram $AlCl_3$/100 g. t-butyl chloride | 1.7 | 2.8 | 4.0 |
| Product composition, wt. percent |  |  |  |
| EDHN [1] |  |  | 1.8 |
| Bicyclohexyl | 87.2 | 21.5 | 7.1 |
| EDHN [1] monochlorides | 0.3 | 2.2 | 5.5 |
| Bicyclohexyl monochlorides | 11.8 | 70.6 | 66.5 |
| Bicyclohexyl dichlorides | 0.6 | 5.7 | 19.0 |

[1] EDHN = ethyldecahydronaphthalenes.

The tabulated data show that dichlorides can be formed from bicyclohexyl under the homogeneous reaction conditions used in the present process but that the dichlorides form relatively slowly from this unsubstituted PHP hydrocarbon as $AlCl_3$ is added to the reaction system. The data indicate that amounts of $AlCl_3$ considerably in excess of 3 parts per 100 parts of t-butyl chloride are needed in order to obtain the dichlorides in good yield when the feed hydrocarbon is bicyclohexyl.

When other unsubstituted PHP's are used as feed, these being specifically the perhydro derivatives of terphenyls, quaterphenyls, quinquephenyls and sexiphenyls, the reaction proceeds in substantially the same manner as when bicyclohexyl is used and dichloro products are formed at equivalent rates. However, when alkyl-substituted PHP's, as herein specified, are employed as feed in place of bicyclohexyl, the dichlorination reaction takes place more readily and generally less $AlCl_3$ per 100 parts of t-butyl chloride is required to reach equivalent yields of dichloro products.

Substantially equivalent results are obtained when tertiary butyl bromide with $AlBr_3$ as catalyst is used in place of tertiary butyl chloride with $AlCl_3$. The halogenation reaction also proceeds in essentially the same manner when tertiary amyl chlorides or bromides are used, but in such cases more side reactions tend to occur.

The invention claimed is:

1. Process of preparing dihalogenated perhydropolyphenyls which comprises:
    (a) forming a solution of (1) a perhydropolyphenyl hydrocarbon having 2–6 rings and 0–3 unbranched alkyl substituents per ring containing 1–3 carbon atoms each, and (2) a $C_4$–$C_5$ tertiary alkyl halide in which the halogen is chlorine or bromine in molar ratio to said perhydropolyphenyl hydrocarbon of at least 2:1, said solution being capable of dissolving and maintaining therein the aluminum trihalide hereinafter specified;
    (b) maintaining said solution at a temperature in the range of −30° C. to 20° C. while admixing therewith and dissolving completely therein so as to form a homogeneous solution an aluminum trihalide in which the halogen is the same as that in said tertiary halide, the weight ratio of aluminum trihalide to the tertiary halide being sufficient to promote dihalogenation of said perhydropolyphenyl hydrocarbon;
    (c) maintaining the resulting solution within said temperature range and in homogeneous phase until at least substantial dihalogenation of said perhydropolyphenyl hydrocarbon has occurred;
    (d) and recovering from the reaction mixture a dihalogenated perhydropolyphenyl product in which the halogen atoms are attached to rings.

2. Process according to claim 1 wherein said $C_4$–$C_5$ tertiary alkyl halide is tertiary butyl chloride or bromide.

3. Process according to claim 2 wherein said temperature is in the range of −10° C. to 10° C.

4. Process according to claim 3 wherein said weight ratio of aluminum trihalide to the tertiary butyl halide is above 3:100.

5. Process according to claim 2 wherein said perhydropolyphenyl hydrocarbon contains 2 rings.

6. Process according to claim 5 wherein said perhydropolyphenyl hydrocarbon is bicyclohexyl.

7. Process according to claim 6 wherein said weight ratio of aluminum trihalide to the tertiary butyl halide is above 3:100.

8. Process according to claim 7 wherein said temperature is in the range of −10° C. to 10° C. and the halogen in the tertiary butyl halide and in the aluminum trihalide is chlorine.

9. Process according to claim 1 wherein said molar ratio of tertiary alkyl halide to perhydropolyphenyl hydrocarbon is in excess of 3:1 and said weight ratio of aluminum trihalide to the tertiary alkyl halide is above 3:100.

10. Process according to claim 9 wherein the tertiary halide is tertiary butyl bromide and the aluminum trihalide is $AlBr_3$.

11. Process according to claim 9 wherein the tertiary halide is tertiary butyl chloride and the aluminum trihalide is $AlCl_3$.

12. Process according to claim 11 wherein said temperature is in the range of −10° C. to 10° C.

References Cited
UNITED STATES PATENTS

| | | | |
|---|---|---|---|
| 2,629,748 | 2/1953 | Condon | 260—648 R |
| 3,096,372 | 7/1963 | Gerzon | 424—321 |
| 3,485,880 | 12/1969 | Schneider | 260—648 R |

DANIEL D. HORWITZ, Primary Examiner